(12) United States Patent
Behrens

(10) Patent No.: US 9,863,394 B2
(45) Date of Patent: Jan. 9, 2018

(54) FLUID TURBINE

(71) Applicant: CASSIUS ADVISORS GMBH, Münster (DE)

(72) Inventor: Michael Behrens, Münster (DE)

(73) Assignee: CASSIUS ADVISIORS GMBH, Münster (DE)

(*) Notice: Subject to any disclaimer, the term of this patent is extended or adjusted under 35 U.S.C. 154(b) by 362 days.

(21) Appl. No.: 14/677,384

(22) Filed: Apr. 2, 2015

(65) Prior Publication Data

US 2015/0285208 A1 Oct. 8, 2015

Related U.S. Application Data

(60) Provisional application No. 61/974,547, filed on Apr. 3, 2014.

(51) Int. Cl.

| | |
|---|---|
| *F03B 11/02* | (2006.01) |
| *F03B 3/12* | (2006.01) |
| *F03B 3/18* | (2006.01) |
| *F03B 3/00* | (2006.01) |
| *F03B 3/06* | (2006.01) |
| *F03D 3/00* | (2006.01) |

(Continued)

(52) U.S. Cl.
CPC ............. *F03B 11/02* (2013.01); *F03B 3/121* (2013.01); *F03B 3/18* (2013.01); *F03D 3/005* (2013.01); *F03D 3/0409* (2013.01); *F03D 3/062* (2013.01); *F05B 2210/16* (2013.01); *Y02E 10/223* (2013.01); *Y02E 10/226* (2013.01); *Y02E 10/74* (2013.01)

(58) Field of Classification Search
CPC ........ F03D 3/0409; F03D 3/005; F03D 3/062; F03B 11/02; F03B 3/121; F03B 3/18; F05B 2210/16; Y02E 10/223; Y02E 10/226; Y02E 10/74
See application file for complete search history.

(56) References Cited

U.S. PATENT DOCUMENTS

| 252,947 A | 1/1882 | Jones |
|---|---|---|
| 2,510,501 A | 6/1950 | Johnson |

(Continued)

FOREIGN PATENT DOCUMENTS

| CN | 101907059 A | 12/2010 |
|---|---|---|
| DE | 3636781 A1 | 5/1988 |

(Continued)

*Primary Examiner* — Igor Kershteyn
(74) *Attorney, Agent, or Firm* — Hudak, Shunk & Farine Co. LPA

(57) ABSTRACT

A fluid turbine 65 is provided, including a rotor 16, including a vertical rotation axis 12, on which at least two rotor blades 18, 20, 22 are arranged, wherein the rotor 16 is arranged within a housing 70, wherein a top 72 and a bottom 74 of the housing 70 are arranged essentially vertical to the rotation axis 12. Each rotor blade 18, 20, 22 has at least a first height 68 at a second distance 69 parallel to the rotation axis 12 and the second height 66 at a second distance 67 parallel to the rotation axis 12, wherein the first distance 69 and the first height 68 are smaller than the second distance 67 and the second height 66, wherein the rotor 16 is rotatable relative to the housing 70. Due to the design of the housing 70, the fluid turbine 65 has particularly high efficiency.

12 Claims, 7 Drawing Sheets

(51) Int. Cl.
*F03D 3/06* (2006.01)
*F03D 3/04* (2006.01)

(56) References Cited

U.S. PATENT DOCUMENTS

| | | | |
|---|---|---|---|
| 4,015,911 A * | 4/1977 | Darvishian | F03D 3/067 416/119 |
| 4,039,849 A * | 8/1977 | Mater | B60K 16/00 290/44 |
| 4,857,753 A * | 8/1989 | Mewburn-Crook | F03D 3/0409 290/43 |
| 5,076,759 A | 12/1991 | Schönell | |
| 5,266,006 A * | 11/1993 | Tsui | F03D 3/067 416/119 |
| 5,525,037 A * | 6/1996 | Cummings | F03D 3/067 416/117 |
| 6,147,415 A | 11/2000 | Fukada | |
| 6,895,812 B2 * | 5/2005 | Dahlberg | G01P 5/06 73/170.01 |
| 7,077,628 B1 * | 7/2006 | Acord | F03D 3/067 415/4.2 |
| 7,696,635 B2 * | 4/2010 | Boone | F03D 3/067 290/55 |
| 2003/0133782 A1 | 7/2003 | Holter et al. | |
| 2005/0201855 A1 | 9/2005 | Fan | |
| 2006/0140765 A1 | 6/2006 | Shih | |
| 2007/0086895 A1 * | 4/2007 | Vanderhye | F03D 3/062 416/197 A |
| 2009/0180880 A1 * | 7/2009 | Ersoy | F03D 3/067 416/132 R |
| 2012/0070282 A1 | 3/2012 | Khan, Sr. et al. | |
| 2012/0243996 A1 * | 9/2012 | Iskrenovic | F03D 1/00 416/132 B |
| 2013/0017083 A1 * | 1/2013 | Graham | F03D 7/0232 416/1 |
| 2013/0323056 A1 | 12/2013 | Su | |

FOREIGN PATENT DOCUMENTS

| | | |
|---|---|---|
| DE | 4434764 A1 | 6/1995 |
| DE | 202004017309 U1 | 3/2005 |
| DE | 202010003361 U1 | 9/2010 |
| DE | 102009042536 A1 | 4/2011 |
| DE | 102011014476 A1 | 7/2012 |
| EP | 2532884 A1 | 12/2012 |
| FR | 822092 A | 12/1937 |
| KR | 20120063888 A | 6/2012 |
| RU | 2418191 C1 | 5/2011 |
| WO | 2009084992 A1 | 7/2009 |
| WO | 2011045820 A1 | 4/2011 |
| WO | 2011136649 A1 | 11/2011 |
| WO | 2013108953 A1 | 7/2013 |

* cited by examiner

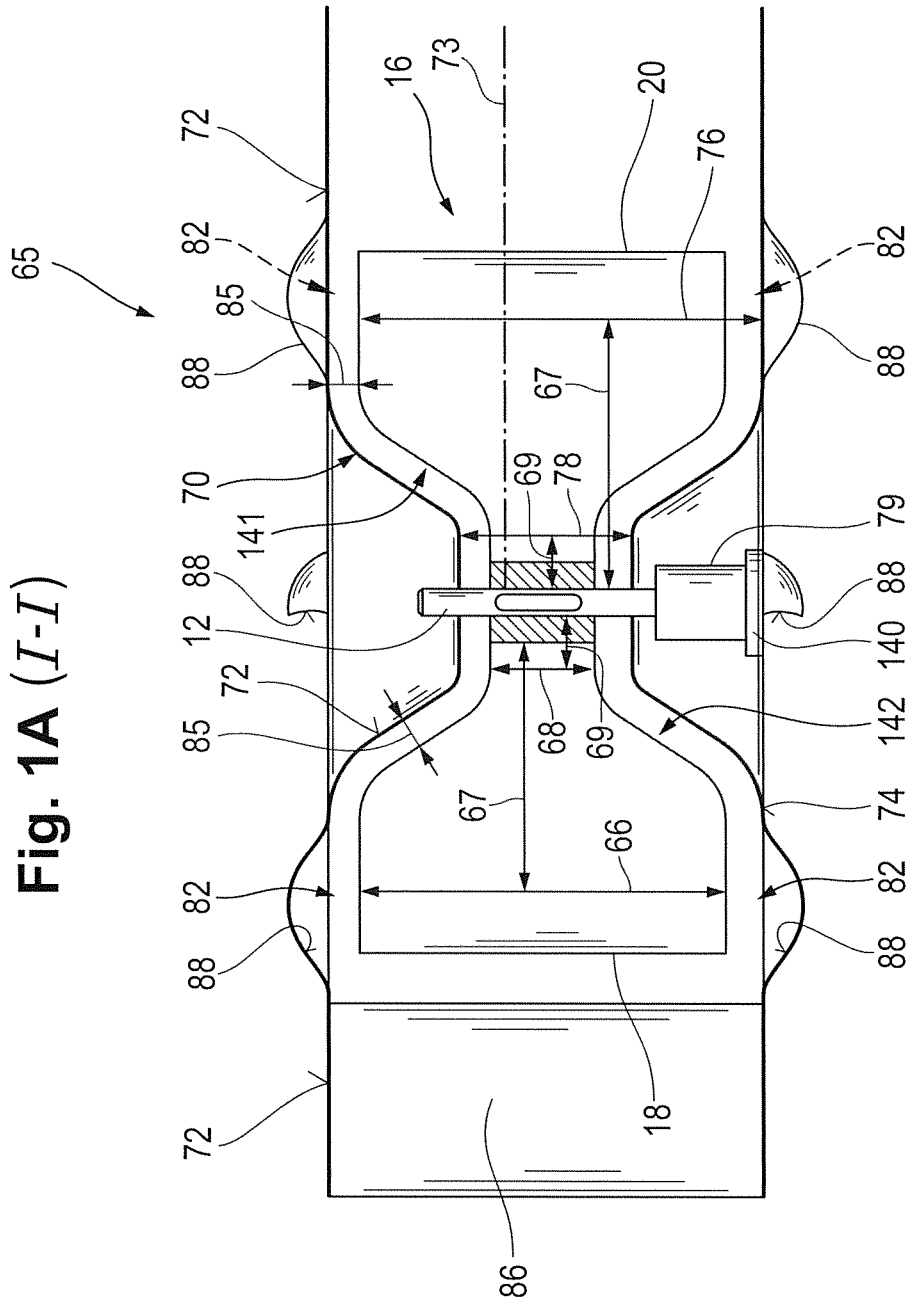
Fig. 1A (I-I)

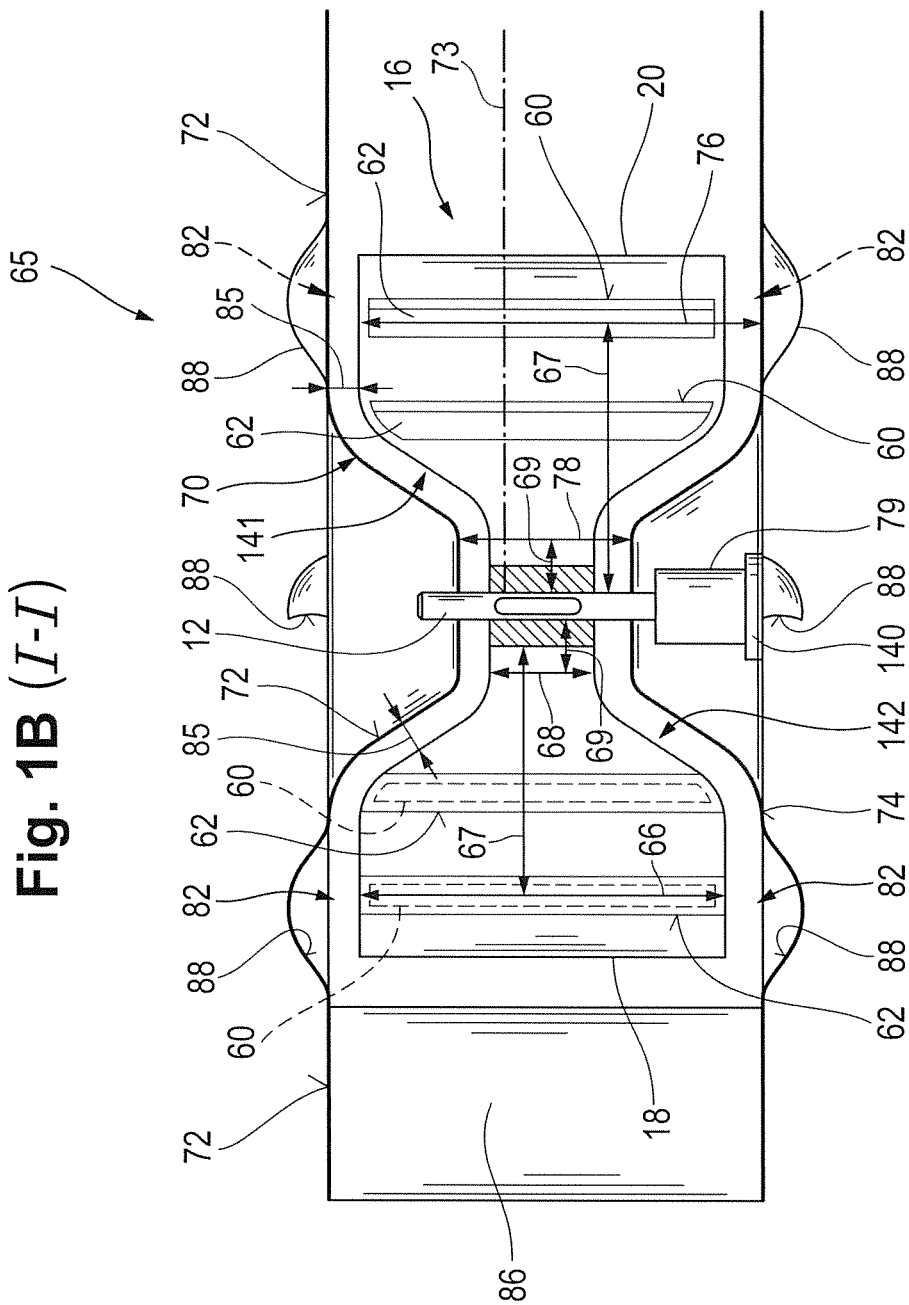

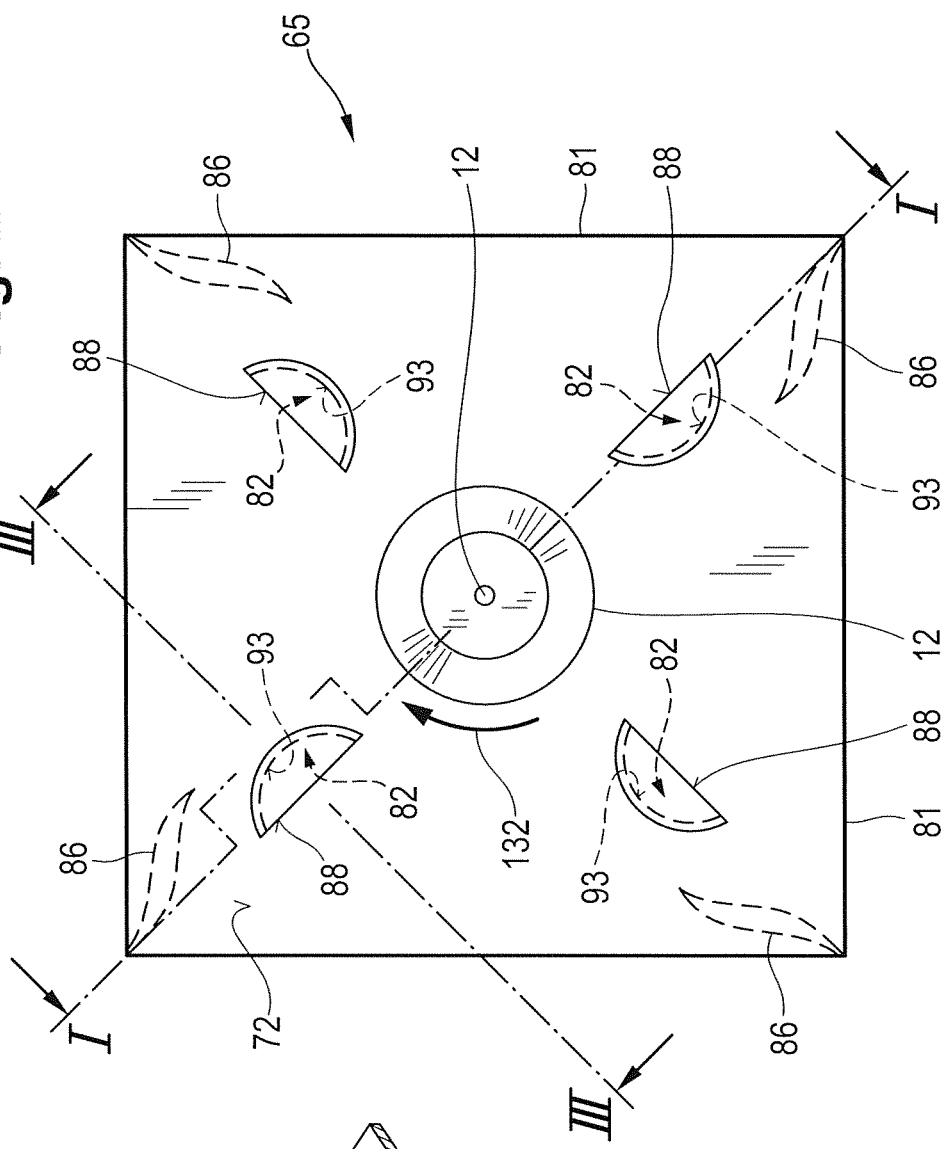
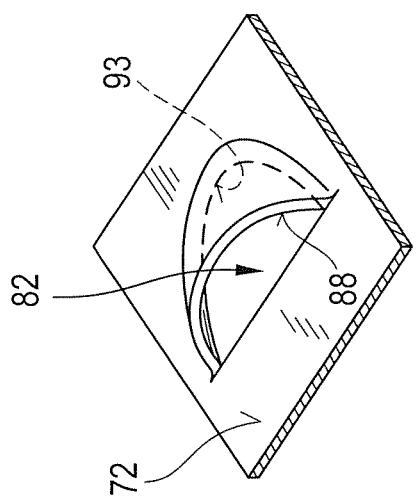

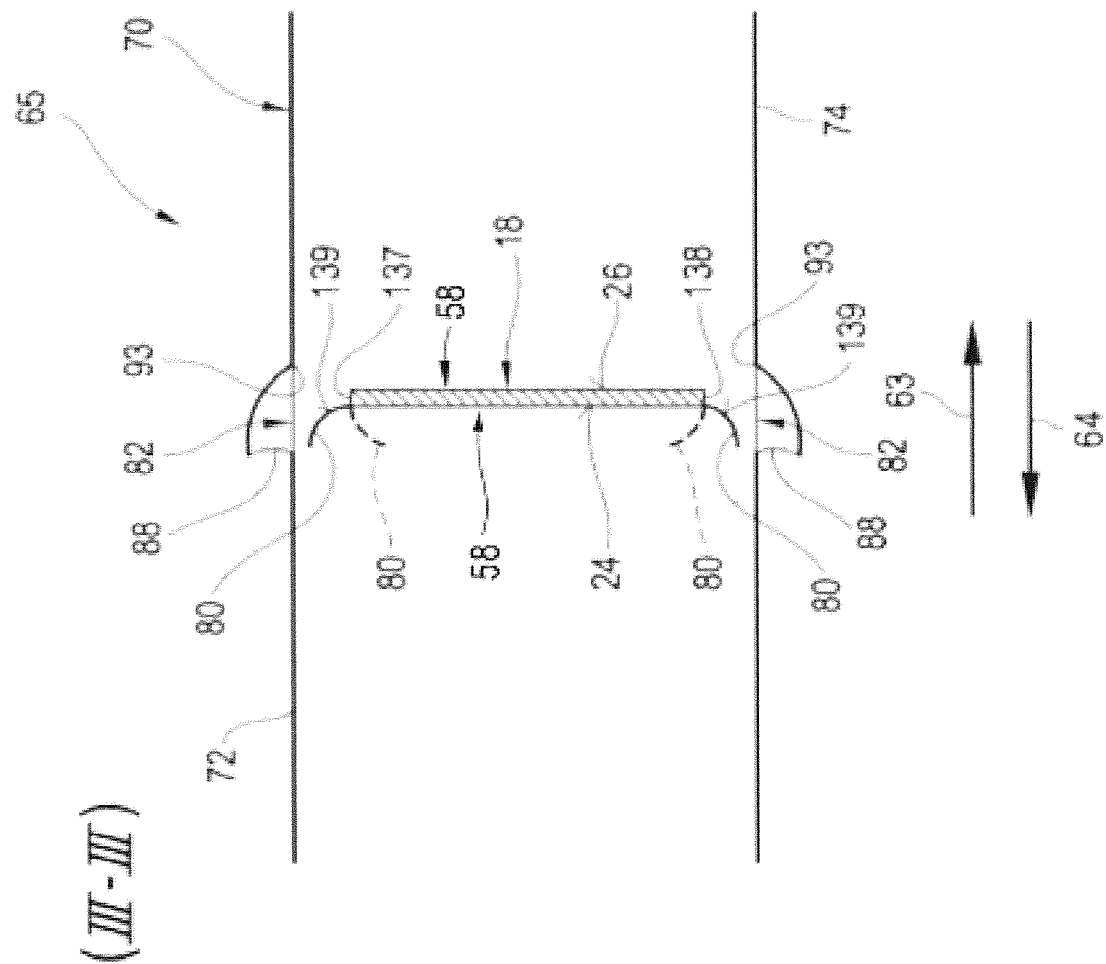

FLUID TURBINE

FIELD OF THE INVENTION

The present invention relates to a fluid turbine with a rotor comprising a vertical rotation axis, on which at least two rotor blades are arranged, wherein the rotor is arranged in a housing, and wherein a top and a bottom of the housing are arranged essentially vertical to the rotation axis, wherein each rotor blade has at least a first height at a first distance parallel to the rotation axis and a second height at a second distance parallel to the rotations axis, wherein the first distance and the first height are smaller than the second distance and the second height, wherein the rotor is rotatable relative to the housing, wherein the housing has at least a first distance between the top and bottom of the housing at a first distance parallel to the rotation axis and a second distance between the top and bottom of the housing at a second distance parallel to the rotation axis, wherein the first distance parallel to the rotation axis and the first distance between the top and bottom of the housing is smaller than the second distance parallel to the rotation axis and the second distance between the top and bottom of the housing.

BACKGROUND OF THE INVENTION

Such fluid turbines are used to generate energy from water, air or other fluid flows. In the operation of such a rotor, at least one rotor blade moves in the direction of or together with the fluid flow and at least one rotor blade moves against the direction of the fluid flow or against the fluid flow. For example, a wind-driven turbine rotor is known from DE 10 2009 042 536 A1, consisting of a vertically rotating rotor with rotor blades coupled to it having a shape which conforms to the inside segment of the housing and the outer swing radius. The inner segment of the housing tapers towards the rotor.

SUMMARY OF THE INVENTION

It is an object of the present invention to provide a fluid turbine that has high efficiency.

The object is achieved by arranging at least one fluid slot in the top and/or bottom of the housing.

The at least one fluid slot is arranged in such a manner that a fluid flow can pass through the fluid slot to the front side of the rotor blade. The front side of the rotor blade will refer here and in the following to the side of the rotor blade on which the fluid flow impinges to move the rotor blade in the direction of the fluid flow. The fluid slot can also be arranged in such a manner that the fluid flow creates a suction as it passes the fluid slot due to the Bernoulli effect, by which the fluid, e.g. air or water, is sucked out of the housing from the area of the back side of the rotor blade. In this way the flow resistance can be reduced when the rotor blade is returned. In this way the efficiency of the fluid turbine can be further improved. The back side of the rotor blade will refer in the following to the side of the rotor blade which is returned against the fluid flow.

The top and/or bottom of the housing can have any shape, e.g. square, round, or polygonal. As a result of the distance between the top and bottom of the housing being smaller in the area of the rotation axis than further removed from the rotation axis, the Venturi effect is created, by which the fluid flow passes by the area near the rotation axis faster toward the outside of the rotor blade. The Venturi effect causes the fluid flow to thus exert a greater pressure force on the outside of the rotor blade which due to the larger impingement area has a greater effect than on the inside of the rotor blade closer to the rotation axis. By these means, the efficiency of the fluid turbine is further increased.

Advantageously, the first height and the second height of the at least two rotor blades are arranged radially symmetrically. Thus, the pressure generated by the fluid flow is distributed in basically the same way over each rotor blade surface.

Preferably at least two fluid slots are arranged in the top and/or bottom of the housing. The first fluid slot is preferably arranged in such a manner that the fluid flow passes through the first fluid slot into the housing and onto the front side of the rotor blade and exerts the greater pressure thereon. The second fluid slot is preferably arranged in such a manner that, due to the Bernoulli effect, a suction is produced by the fluid flow passing the fluid slot, through which the fluid, such as air or water, is sucked from the area of the back side of the rotor blade out of the housing, thus reducing the flow resistance as the rotor blade is returned. By these means, the efficiency of the fluid turbine can be further increased. In particularly preferred embodiments at least two fluid slots as described above are arranged in the top and the bottom of the housing, whereby the efficiency of the fluid turbine can be even further improved.

Preferably the distance between the top of the housing and the rotor blades and between the bottom of the housing and the rotor blades is essentially constant. This is the best way of utilizing the fluid flow since there are no areas between the rotor blade and the top and bottom of the housing where the fluid flow passes quicker, for example, than others. The fluid flow is thus directed particularly uniformly onto the outside of the rotor blade.

In advantageous embodiments, at least one rotor blade comprises at least one opening with an openable closure element. Preferably, each rotor blade comprises at least one opening with an openable closure element. The closure element is arranged, for example as a flap, on one side of the rotor blade in such a manner that the closure element opens the opening due to the fluid flow when the rotor blade is moving against the fluid flow. By these means, the flow resistance of the rotor blade is reduced when it is returned against the fluid flow. The closure element is also arranged in such a manner that it closes the opening due to the fluid flow when the rotor blade is moving in the direction of the fluid flow. In this way the flow resistance of the rotor blade remains just as high when it is receiving the fluid flow as it would be without the at least one opening in the first portion of the rotor blade. This helps to further improve the efficiency of the rotor.

Preferably at least one rotor blade comprises a curved first portion, wherein the first portion has a concave side and a convex side, wherein a curved second portion is arranged on the end of the first portion of the rotor blade facing away from the rotation axis, wherein the second portion has a concave side and a convex side, and wherein the two portions are arranged in such a manner that, in the radial direction, the convex side of the first portion is followed by the concave side of the second portion. By this arrangement the second portion at the first portion of the rotor blade on the convex side of the first portion and the concave side of the second portion of the rotor blade, also referred to as the front side of the rotor blade in the following, in particular on the end of the rotor blade facing away from the rotation axis, a particularly high resistance against the fluid flow impinging thereon is achieved. Since the lever action is at its greatest there, the greatest transmission of force is achieved so that the rotor blade is particularly effectively moved in the direction of the fluid flow. In contrast, due to the concave side of the first portion and the convex side of the second portion, referred to as the back side of the rotor blade in the following, the side of the rotor blade moving against the direction of the fluid flow is more aerodynamic, in particular on the end of the rotor blade facing away from the rotation axis, and has a lower flow resistance.

Preferably, more than one, or all rotor blades, respectively, comprise a first and second portion, as described above.

The rotor blade or blades are preferably integrally formed, i.e. have a one-piece configuration. This has the advantage that the rotor blades do not have to rely on supporting structures on the top and/or bottom. In preferred embodiments, the rotor blade or blades can have cut-outs in the area of the rotation axis, so that the fluid flow can pass through these cut-outs and accumulation of the fluid flow will not be too strong.

Preferably the rotor has three rotor blades. This enables particularly high efficiency to be achieved with comparatively low material costs. In alternative embodiments two, four, five or more rotor blades can be provided.

Advantageously an angle formed between the convex side of the first portion and the concave side of the second portion is smaller than 120°, such as 110° or 100°, preferably smaller than 90°, e.g. 80°. By these means, a bucket-like shape of the at least one rotor blade is achieved, into which the fluid flow is guided and which provides higher flow resistance to the fluid flow, thus enabling a high proportion of the fluid flow to be used for force transmission. The force transmission is particularly effective since this bucket-like area of the at least one rotor blade is far removed from the rotation axis so that the fluid flow impinging here has a greater lever action. On the side of the rotor blade moving against the fluid flow, a particularly aerodynamic shape results due to the angle formed, which is smaller than 120°, for example 110° or 100°, preferably smaller than 90°, for example 80°, thus decreasing the flow resistance on this side. By these means, less force is used to return the rotor blade against the fluid flow. This shape of the rotor blade is particularly efficient because it is arranged in an area remote from the rotation axis, which is where the highest rotation speed occurs. Alternatively the angle formed between the convex side of the first portion and the concave side of the second portion can be variably configured, for example by linking the two portions in an articulated manner.

In preferred embodiments, at least one wing element is moveably arranged on an upper edge and/or a lower edge of at least one rotor blade preferably in the area of the first portion. The wing element is preferably arranged in such a manner that when the fluid flow impinges on the front side of the rotor blade, it flips up and thus increases the surface area of the rotor blade. By these means the fluid flow can be even better received by the rotor blade. When the rotor blade is returned against the fluid flow, the wing element folds towards the front side of the rotor blade due to the fluid flow impinging on the back side of the wing element, so that no additional surface area results and thus the rotor blade does not have a greater flow resistance when moved against the fluid flow. In this way the efficiency of the rotor can be even further improved. It is preferably formed in such a manner that it cannot be pressed beyond the top or bottom edge by the fluid flow into the area of the back side of the rotor blade. The wing element can for example be mounted swivably on a swivel axis and/or be made from an elastic material. Preferably, it can span along one or more than one section or continuously along the entire length of the upper edge and/or lower edge of the first portion of the rotor blade. Preferably more than one or each rotor blade comprises at least one wing element. Particularly preferably, at least one wing element is moveably arranged on each upper edge and each lower edge of the rotor blade.

Advantageously at least one vane element is moveably arranged on the side, preferably the convex side, of the second portion of the rotor blade. The vane element is arranged in such a manner that its free end protrudes from the side of the rotor blade when the rotor blade is moving with the fluid flow. By these means, an additional surface area is provided for receiving the fluid flow on the front side of the rotor blade. If the rotor blade is returned against the fluid flow, the vane element is closely adjacent to the side of the rotor blade and thus reduces the flow resistance of the rotor blade during its return. By these means the efficiency can be additionally increased.

BRIEF DESCRIPTION OF THE DRAWINGS

The present invention will be described in more detail with reference to a preferred exemplary embodiment, wherein:

FIG. 1A shows a sectional view along line I-I of FIG. 2 of a wind turbine according to a first example of the present invention;

FIG. 1B shows a sectional view along line I-I of FIG. 2 of a wind turbine according to a second example of the present invention;

FIG. 2 shows a plan view of a wind turbine according to the first example;

FIG. 2A shows a detailed view of a fluid slot of FIG. 2;

FIG. 3 shows a sectional view along line III-III of FIG. 2 of a wind turbine according to the first example;

DETAILED DESCRIPTION OF THE INVENTION

Figure 4:
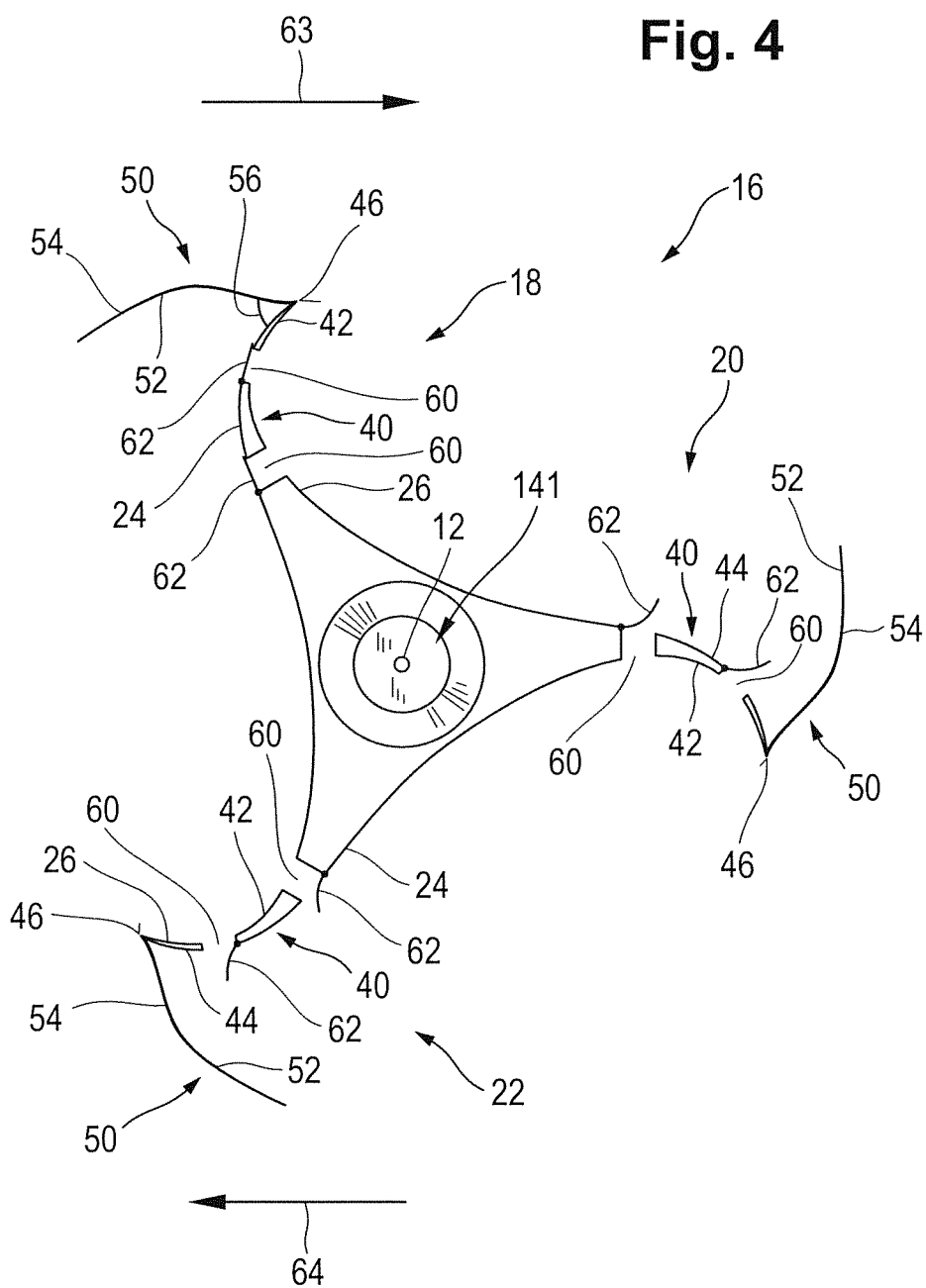
FIG. 4 shows a plan view of a rotor according to a third example of the present invention.

The invention will be described in an exemplary manner with reference to examples embodied as a wind turbine or a rotor for a wind turbine. The following explanations therefore also apply to rotors and turbines for any other fluids, in particular water.

FIG. 1A shows a sectional view along line I-I of FIG. 2 of a wind turbine 65 according to a first example. The wind turbine 65 comprises a housing 70, in which the rotor 16 is rotatably arranged relative to the housing 70. The illustration shown in FIG. 1A comprises two rotor blades 18, 20, each having a first height 68 at a first distance 69 parallel to the rotation axis 12 and a second height 66 at a second distance 67 parallel to the rotation axis 12. The first distance 69 and the first height 68 are smaller than the second distance 67 and the second height 66 so that the rotor blades 18, 20 taper towards the rotation axis 12. This creates a top and bottom hub recess 141, 142 of the rotor 16. In alternative embodiments, instead of a continuous taper, for example, a step could also be provided. The tapering of the rotor blades 18, 20 towards the rotation axis 12 is preferably non-linear, but the height 66 is constant in a predefined area and descends to the first height 68 in the shape of a curve. Preferably, the taper, as shown here, is symmetrical to a longitudinal axis 73 of the rotor blade 18, 20, vertical to the rotation axis 12. The first height 68 and the second height 66 are arranged radially symmetrically, that is the first height 68 and the second height 66 being the equal for both rotor blades 18, 20 and in the same distance 69, 67 from the rotations axis 12, respectively.

The housing 70 comprises a top 72 and a bottom 74 arranged essentially vertical to the rotation axis 12. The housing 70 comprises a first distance 78 between the top and bottom 72, 74 of the housing 70 at the first distance 69 parallel to the rotation axis 12 and a second distance 76 between top and bottom 72, 74 of the housing 70 at the second distance 67 parallel to the rotation axis 12. Herein, the first distance 69 parallel to the rotation axis 12 and the first distance 78 between top and bottom 72, 74 of the housing 70 are smaller than the second distance 67 parallel to the rotation axis 12 and the second distance 76 between top and bottom 72, 74 of the housing 70. The distance 85 between the top 72 of the housing 70 and the rotor blades 18, 20, 22 and between the bottom 74 of the housing 70 and the rotor blades 18, 20, 22 is preferably essentially constant. The housing 70 thus conforms to the hub recesses 141, 142 of the rotor 16. The tapering of the housing 70 causes the Venturi effect, by which the wind flow is directed onto the outer sides of the rotor blades 18, 20, thus increasing the efficiency of the wind turbine, since the outer sides of the rotor blades 18, 20 have a higher lever action.

In an area below the bottom hub recess 142 below the bottom 74 of the housing 70, in the example shown in FIG. 1A, a generator 79 is arranged on the rotation axis 12, which is arranged by a generator flange 140 in a non-rotation manner on a support structure (not shown) such as a support element or a mast, and transforms the rotation of the rotor 16 to electrical energy. The support element can have, for example, a similar size as the housing 70, to attach the housing 70 near the ground or at different surface, such as a roof. Alternatively, the generator 79 can also be arranged above the housing 70 on its top 72 above the top hub recess 141. In this position the generator 79 is essentially protected against wind. The area above the top hub recess 141 and/or the area below the bottom hub recess 142 in which, in the present example, the generator 79 is arranged, can also be covered, such as by means of a plate, thus enabling the generator 79 to be protected against further weather phenomena, such as rain, or to be protected against the water surrounding the housing 70 when it is arranged in water.

FIG. 1A also shows fluid slots 82 each arranged in the area on the top 72 and the bottom 74 of the housing 70 in which the outer sides of the rotor blades 18, 20 move. A cover element 88 is arranged above the fluid slots 82, creating an opening. The cover element 88 can be formed, for example, by a bulge of the top 72 above the fluid slots 82 in the top 72, or a bulge of the bottom 74 below the fluid slots 82 on the bottom 74. The or each opening can be created by removing a portion of the top 72 or bottom 74, thus creating a fluid slot 82, and integrally forming a corresponding, separate cover element, thus defining the direction of the opening. The direction of the opening of the fluid slots 82 preferably depends on the direction of rotation of the rotor 16, as will be described in more detail with reference to FIG. 2, of which only the rotation axis 12 is visible in the present illustration. Since this area of the outer sides of the rotor blades 18, 20, remote from the rotation axis, exhibits great lever action, an additional intake of wind flow onto the front side and withdrawal of wind flow from the back side of the rotor blades 18, 20 is particularly effective here. For fluid slots 82, shown on the left side of the housing 70 in the present illustration, the opening faces out of the drawing plane. On the right side of the present illustration of the housing 70, the openings of the fluid slots 82 arranged there face into the drawing plane. The centrally shown cover elements 88 are shown in a side view, they are in the background of section line I-I of FIG. 2 and form an opening for the fluid slots arranged there (not visible in FIG. 1A). In alternative embodiments, the fluid slots 82 can also be formed above the top and below the bottom hub recesses 141, 142 reaching into the area of the rotation axis 12 of the rotor 16, or a plurality of fluid slots 82 can be arranged side-by-side.

FIG. 1B shows a wind turbine 65 according to a second example of the present invention in a sectional view along line I-I of FIG. 2. The example shown in FIG. 1B essentially corresponds to the one shown in FIG. 1A, however, in the exemplary embodiment shown in FIG. 1B, each rotor blade 18, 20 additionally comprises two openings 60 with an openable closure element 62, arranged in the present exemplary embodiment in the area of the second height 66 and in the area in which the hub recesses 141, 142 of the rotor blades 18, 20 begin at the first height 68. The closure elements 62 on the rotor blade 18 shown on the left are shown in a closed state, which corresponds to a position which the closure elements 62 assume when the direction of the wind flow faces in the first direction 63 (FIG. 3) and the rotor blade 18 is moving in the first direction 63. Therefore the openings 60 which are covered by the closure elements 62 are shown in broken lines. The closure elements 62 on the rotor blade 20 shown on the right are open, since the rotor blade 20 is moving in the second direction 64 (FIG. 3) against the wind flow. A portion of the opened closure element 62, which is bent into the drawing plane, as also shown in FIG. 4, is visible through opening 60.

The wind turbine 65 according to the first example of the present invention can also be operated with any fluid other than air, for example with water.

FIG. 2 shows a plan view of a wind turbine 65 according to the first example. The top and bottom 72, 74 are square at the outer edges 81 in the present example, wherein here neither the bottom 74 nor the rotor blades are shown so that the top 72 is visible. In the present exemplary embodiment four fluid slots 82 are arranged in the top 72. Instead of the four fluid slots 82 in the top 72, it is also possible in further preferred exemplary embodiments, to arrange only one, two, three, but also five, six or more fluid slots 82 in the top 72. One or more fluid slots 82 can also be arranged on the bottom 74 of the housing 70, as also shown in FIGS. 1A and 1B, for example. The direction of the opening of the fluid slots 82, which is defined by the arrangement of the cover element 88, preferably depends on the direction of rotation 132 of the rotor, of which only the rotation axis 12 is visible in the present illustration. The opening of the fluid slots 82 corresponds to the direction of rotation 132 of the rotor, i.e. the rotor blades 18, 20 (cf. FIG. 1A, 1B) pass below each fluid slot 82 of the top 72, or above each fluid slot 82 of the bottom 74 (cf. FIG. 1A, 1B), passing the area of the opening first and then a trailing edge 93 of the fluid slot 82. The direction of rotation 132 corresponds to the preferred direction of rotation of the rotor. FIG. 2A shows a detail view of a fluid slot 82 in the top 72 of the housing 70.

FIG. 3 shows a sectional view along line III-III of FIG. 2 of the wind turbine 65 according to the first example. Here, a support element 86 (cf. FIG. 2) which is behind the rotor blade 18 in the perspective, is not shown for clarity. A wing element 80 is moveably arranged on each of an upper edge 137 and a lower edge 138 of the rotor blade 18 shown here. On the other hand, the wing elements 80 can be flipped up by the wind flow in the direction of the top or bottom 72, 74 of the housing 70 when the wind flow impinges on the front side 24 of the rotor blade 18 and moves the latter in the first direction 63. By these means, the surface area of the rotor blade 18 on which the wind flow impinges is enlarged, so that the latter can be better received by the rotor blade 18. The wing elements 80 can be of a rigid or flexible material and, as an alternative to the simply curved shape shown in FIG. 3, can also be partially straight, straight or curved in several places. Overall, they are shaped and moveably arranged in such a manner that, in the flipped-up position, an air gap remains, for example in the order of a few millimeters, so that the wind flow can circulate and there is no disadvantageous air stall. This means that the height of the flipped-up wing elements 80 corresponds to less than the distance 85 (cf. FIG. 1A, 1B) between the top 72 or the bottom 74 of the housing 70 and the rotor blade 18 shown here. The wing element 80 can preferably not be folded beyond the upper or lower edge 137, 138 of the rotor blade 18 towards the back side 26 of the rotor blade 18.

On the other hand, the wing elements 80 can be folded down when the wind flow impinges on the back side 26 of the rotor blade 18 and thus the back side 139 of the wing element 80, when the rotor blade 18 is moving in the second direction 64 against the wind flow. This folded-down position is shown in FIG. 3 in an exemplary manner with a broken line. In the folded-down position of the wing elements 80, the wind flow can escape better between wing elements 80 and the rotor blade 20 than in the flipped-up position of the wing element 80, thus reducing the pressure exerted on the back side 26 of the rotor blade 20. The wing elements 80 can span along one or more than one section or continuously along the entire length of the upper edge 137 and/or lower edge 138 of the first portion 40 (FIG. 1) of the rotor blade 18. They can for example be mounted swivably on a swivel axis and/or be made from an elastic material and mounted elastically.

FIG. 3 also shows fluid slots 82 arranged in the top 72 and bottom 74 of the housing 70. The fluid slots 82 have their opening aligned by the cover element 88 in such a manner that a wind flow moves across the fluid slots 82 in the second direction 64. Due to the Bernoulli effect, a suction is created by the wind flow sucking air out of the housing 70 through the fluid slots 82. When the rotor blade 18 is moving in the second direction 64 against the wind flow, returning of the rotor blade 18 against the wind flow is facilitated since the pressure on the back side 26 of the rotor blade 18 is reduced in this area. A wind flow in the first direction 63 can pass through the opening into the housing 70 and onto the front side 24 of the rotor blade 18. By the additional intake of wind flow onto the front side 24 of the rotor blade 18 the rotor is driven more effectively. Because of the first height 68 (FIG. 1) and the second height 66 (FIG. 1) being arranged radially symmetrically, the pressure, positive or negative, generated by the fluid flow through the fluid slots 82 on the front or back sides 24, 26 of the rotor blades is distributed basically in the same way over the respective blade surfaces 58. Thus, it is possible to avoid an imbalance of the rotation of the rotor and to drive it particularly effectively.

As an alternative, a plurality of fluid slots 82 with cover elements 88 can also be arranged on the top and bottom 72, 74 of the housing 70, as also shown in the examples of FIGS. 1 and 2.

FIG. 4 shows a plan view of a rotor 16 according to a third example of the present invention. In the present example, the rotor 16 comprises a vertical rotation axis 12, normal to the drawing plane in the present illustration, and three rotor blades 18, 20, 22, arranged on the rotation axis 12. Alternatively, two, four, five or more rotor blades could also be arranged on the rotation axis 12 instead of the three rotor blades 18, 20, 22. In the presently shown example, each rotor blade 18, 20, 22 comprises a curved first portion 40, having a concave side 42 and a convex side 44. On the end 46 of the first portion 40 facing away from the rotation axis 12, a curved second portion 50 is arranged having a concave side 52 and a convex side 54. The first and second portions 40, 50 are arranged in such a manner that, in the radial direction, the convex side 44 of the first portion 40 is followed by the concave side 52 of the second portion 50. The second portion 50 is preferably directly integrally formed, i.e. without an air gap or the like, on the first portion 40. An angle 56 is formed between the convex side 44 of the first portion 40 and the concave side of the second portion 50, which is smaller than 90° in the example shown. In alternative embodiments, the angle 56 formed can also be between 90° and 120°, for example 95°, 100°, 105°, 110° or 115°, or any angle between them. In further alternative embodiments, the angle 56 formed can also be variable, for example by linking the first and second portions 40, 50 in an articulated manner, in particular in such a way that the angle 56 is reduced at times to angles substantially smaller than 90°, to as little as 0°. By these means, the resistance against the fluid flow can be further minimized as the rotor blade 18, 20, 22 is moved against the direction of flow. By arranging the second portion 50 on the first portion 40, a kind of bucket is formed for the fluid flow on the front side 24 of the rotor blade 18, 20, 22. Here and in the following examples, a wind flow is presupposed as the fluid flow. However, the rotor blades could also be driven by the flow of any type of fluid, preferably with air or water. Since the bucket is formed in the area remote from the rotation axis, the wind flow impinging there can be particularly efficiently utilized, since it has a greater lever action. A tip is formed on the back side 26 of the rotor blade 18, 20, 22 on the end 46 of the first portion 40, which has an advantageous coefficient of flow resistance. In the embodiment having a moveable linkage of the portions 40, 50 and the variable angle 56, the pivot point between the two portions 40, 50 can be arranged on the end 46. For applications in fluids having a higher density, such as water, in particular, the end 46 can be formed as a bead instead of a point. The point or the bead, respectively, forms a protruding edge that points into the preferred direction of rotation of the rotor 16. In the presently shown arrangement, the preferred direction of rotation of the rotor 16 corresponds to a rotation of the rotor 16 in the clockwise direction.

In alternative embodiments, not every rotor blade 18, 20, 22 need have a first and second portion 40, 50, as described above, but only one or two of three rotor blades, or any number of rotor blades in a rotor having more than three rotor blades, can have such first and second portions 40, 50.

At the transition to the first portion 40, the second portion 50 is preferably the same height, e.g. the second height 66 (cf. FIGS. 1A, 1B) as the first portion 40 in this area. Towards the end of the second portion 50 facing away from the first portion 40, the height of the second portion 50 can decrease or remain constant.

In the presently shown example, two openings 60 having an openable closure element 62 are arranged in the first portion 40 of each of the rotor blades 18, 20, 22. The closure element 62 is arranged in each case in such a manner that it closes the opening 60 when the rotor blade 18, 20, 22 is moving in a first direction 63, which corresponds to the direction of the wind flow, and that it opens the opening 60 when the rotor blade 18, 20, 22 is moving in a second direction 64 which corresponds to the direction against the wind flow. The rotation of the rotor 16, in the present example, is in the preferred direction of rotation, i.e. the clockwise direction. In the example shown in FIG. 1, two openings 60 with closure elements 62 are arranged in the portion 40 of each of rotor blades 18, 20, 22. Alternatively, one, three, four or more openings 60, each having a closure element 62, could also be provided in the first portion 40 of the rotor blade 18, 20, 22. The closure element 62, in the exemplary embodiment shown here, is formed as a flap and of a flexible material, which can bend. However, the flap can also be of a rigid material. In the example shown in FIG. 4, the flap is pivotably supported at one end on the side of the opening 60 closer to the rotation axis 12, wherein the other end of the flap extends radially outwards. When the flap closes off the opening 60, the radially inwardly extending end of the flap, for example, is arranged on the first portion 40 of the rotor blade 18, 20, 22 adjacent to the opening 60. The flap shown in the present exemplary embodiment is preferably arranged on the front side 24 of the rotor blade 18, 20, 22, so that it is pressed against the first portion 40 of the rotor blade 18, 20, 22 and thus closes off the opening 60, when the rotor blade 18, 20, 22 is moving in the direction of the wind flow. If the rotor blade 18, 20, 22 is moved in the second direction 64 against the wind flow, the flap automatically opens the opening, since the wind flow penetrating the openings 62 from the back side 26 of the rotor blade 18, 20, 22, presses against the flap so that it swings open. In this way the flow resistance of the back side 26 of the rotor blade 18, 20, 22 is reduced.

The rotor 16 comprises hub recesses 141, 142 in the area of the rotation axis 12, wherein only the top hub recess 141 can be shown in the plan view of FIG. 4. Additionally, the rotor 16 can have cut-outs in the area of the rotation axis 12 for the wind flow to pass through these cut-outs in order to avoid accumulation of the wind flow becoming too strong.

Figure 5:
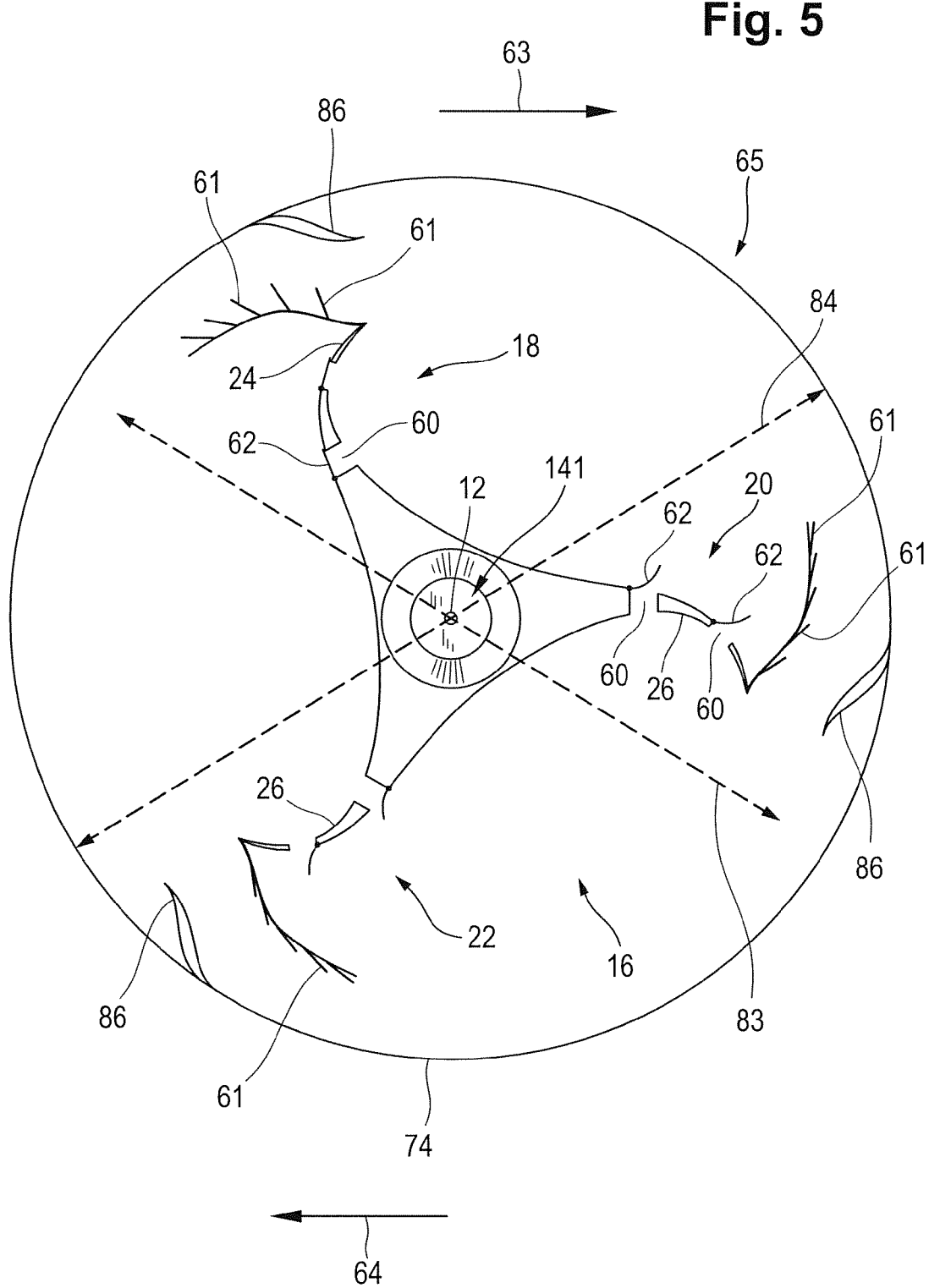
FIG. 5 shows a plan view of a wind turbine according to a fourth example.
Figure 6:
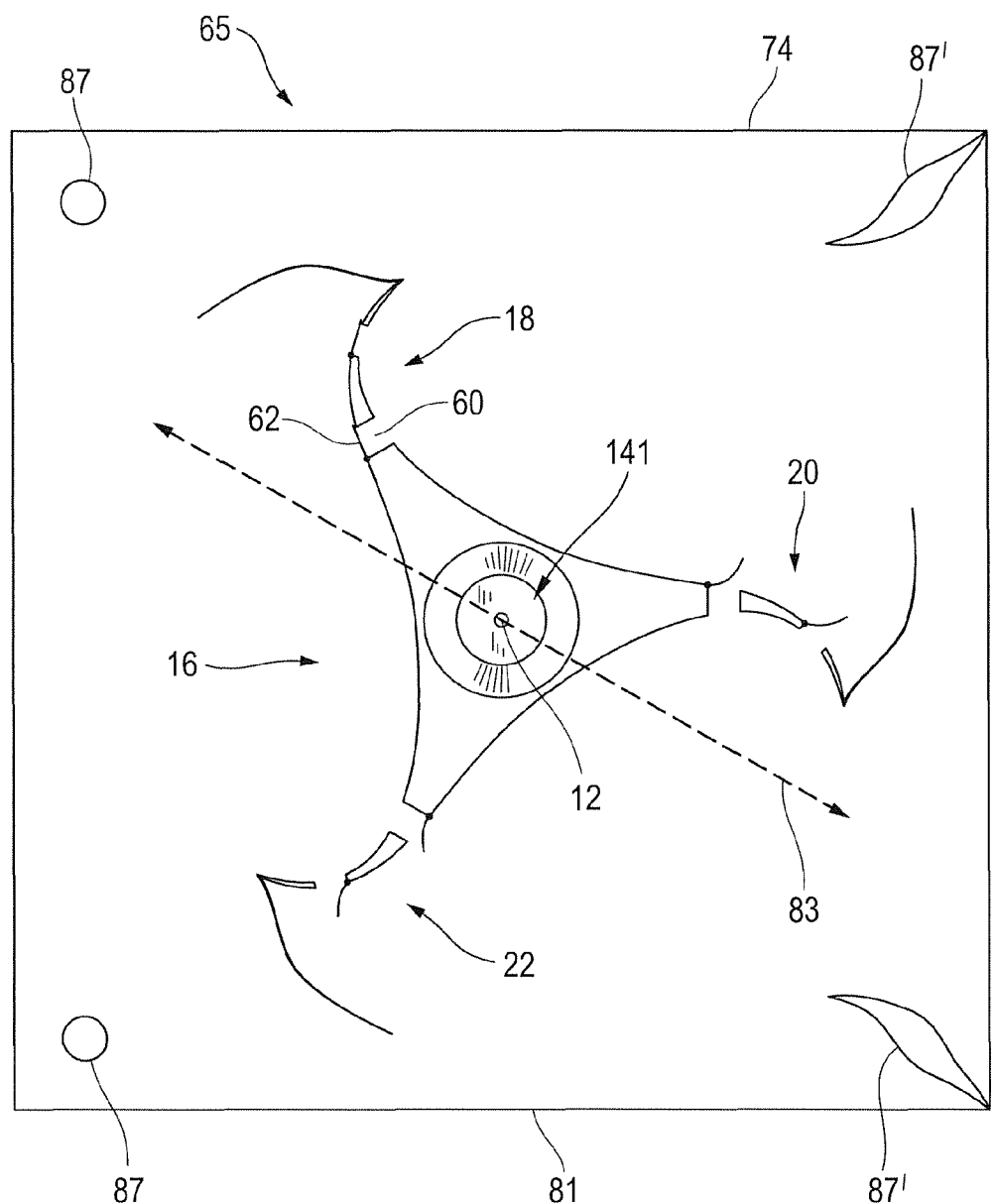
FIG. 6 shows a plan view of a wind turbine according to a fifth example.

FIGS. 5 and 6 show wind turbines 65 with a housing 70 according to a fourth and fifth exemplary embodiment, respectively, of the present invention in a plan view.

In FIG. 5, the housing 70 comprises top and bottom 72, 74 having a circular circumference. For reasons of clarity, the top 72 is omitted in FIG. 5 so that the underlying rotor 16 is visible. The diameter 84 of the top and bottom 72, 74 is preferably larger than the diameter 83 of the rotor disk of the rotor blades 18. Support elements 86 for the top and bottom 72, 74, which are formed contiguous from the top 72 to the bottom 74, are preferably arranged between the top and bottom 72, 74 of the housing 70 as shown in FIG. 5, in an area outside of the rotor disk of the rotor blades 18, 20, 22. They mainly serve to support the top and bottom 72, 74 so that the rotor blades 18, 20, 22 are free to rotate between the top and bottom 72, 74 of the housing 70. The support elements 86 have a curved configuration in the present exemplary embodiment so that they guide the fluid flow so that it impinges, for example, at a favorable angle and/or at a changed speed on the rotor blades 18, 20, 22 and/or so that the fluid flow impinging on the rotor blades 18, 20, 22 is not negatively affected, such as by unfavorable swirling. More or less than three support elements 86 as shown, for example four, five, six or seven, or just two support elements 86 can be arranged between the top and bottom 72, 74 in equal or any distance to each other. The support elements 86 are not closer than the rotor disk of the rotor blades 18, 20, 22 and do not contact the latter. The rotor 16 essentially corresponds to the rotor shown in FIG. 4, each rotor blade 18, 20, 22 having two openings 60 provided with an openable closure element 62. However, in FIG. 5, five vane elements 61 are moveably arranged in addition on the convex side 54 of the second portion of the rotor blade 18, 20, 22. The number of vane elements is any particular number, so that one, two, three, four, six or more vane elements could also be provided in alternative embodiments. The vane elements 61 flip up from the convex side 54 of the rotor blade 18, 20, 22 when the latter is moving in the direction of the wind flow, in this case in the first direction 63, due to the wind catching under the vane element 61. In this way the surface of the rotor blade 18, 20, 22, which is caught by the wind flow in the first direction 63, is enlarged, which means that the wind flow can be better received. This is particularly effective in the area remote from the rotation axis because of the greater lever action in this area. On the other hand, the vane elements 61 are closely adjacent to the convex side 54 of the second portion 50 of the rotor blade 18, 20, 22 when it is moving in the second direction 64 against the wind flow. The flow resistance of the back side 26 of the rotor blade 18, 20, 22 is thus not substantially increased by the vane elements 61.

The wind turbine 65 shown in FIG. 5 can also be operated with other fluids instead of air, preferably for example with water.

In FIG. 6, the top and bottom 72, 74 of the housing 70 have a square configuration at the outer edges 81, wherein the top 72 is not shown for clarity. The rotor 16 corresponds to the rotor shown in FIG. 4, each rotor blade 18, 20, 22 having two openings 60, which are closable by means of an openable closure element 62. The top and bottom 72, 74 of the housing 70 protrude beyond the diameter 83 of the rotor disk of the rotor blades 18, 20, 22 on all sides. Support elements 87, 87' are arranged between the top and bottom 72, 74 at the four corners of the top and bottom. The support elements 87, 87' extending from the top 72 to the bottom 74 can be formed as rods, for example having a round cross-section, such as the support elements 87 shown on the left, or having a curved cross-section, such as the support elements 87' shown on the right as an alternative embodiment. However, other shapes, such as square or wedge-shaped cross-sections are also possible, and can in this way influence the direction of the wind flow. The number of the support elements 87, 87' can differ from and can particularly be larger than the number of the support elements 87, 87' shown in FIG. 6. For example, two, five, six, seven or more support elements 87, 87' can be provided. Otherwise the support elements 87, 87' serve to support the top and bottom 72, 74 of the housing 70 so that the rotor blades 18, 20, 22 are free to rotate between the top and bottom 72, 74.

In further alternative embodiments, not shown here, the top and bottom of the housing can also be triangular or have more than four corners, and the top can also have a different shape from the bottom. The wind turbine 65 shown in FIG. 6 can alternatively be operated with a different fluid, such as with water.

In other alternative embodiments, also not shown here, at least one flap element is arranged along the top and the bottom of the housing, extending radially outwardly from the rotation axis. The height of the flap element parallel to the rotation axis corresponds to the distance between the top or bottom of the housing and the rotor blades. Preferably, the flap element is pivotable about a hinging point by a maximum of 90°, such as between 0° and 90°, or between 0° and 70°, from a position parallel to the rotation axis into a folded-down position. The flap element is preferably arranged in such a manner that it is in the position parallel to the rotation axis when the rotor blade situated directly between the flap element at the top and bottom, is moving with the fluid flow. By these means the flow resistance of the rotor blade is increased. When the rotor blade is moving between the flap elements against the fluid flow, it is in the folded-down position. In this way, the flow resistance of the rotor blade is reduced.

In other embodiments also not shown here, a sidewall of the housing can also be provided, partially extending between the top and bottom of the housing. Preferably it comprises a fluid inlet opening and a fluid outlet opening and can serve to shield the rotor blades against unfavorable fluid flows.

LIST OF REFERENCE NUMERALS 12 rotation axis
16 rotor
18 rotor blade
20 rotor blade
22 rotor blade
24 front side
26 back side
40 first portion
42 concave side
44 convex side
46 end of first portion
50 second portion
52 concave side
54 convex side
56 angle
58 surface
60 opening
61 vane element
62 closure element
63 first direction
64 second direction
65 wind turbine
66 second height
67 second distance
68 first height
69 first distance
70 housing
72 top
73 longitudinal axis
74 bottom
76 second distance
77 cavity
78 first distance
79 generator
80 wing element
81 outer edges
82 fluid slot
83 diameter
84 diameter
85 distance
86 support elements
87 support elements
87' support elements
88 cover element
93 rear end of fluid slot
137 upper edge
138 lower edge
139 back side of wing element
140 generator flange
141 upper hub recess
142 lower hub recess

What is claimed is:

1. A fluid turbine, comprising: a rotor, comprising a vertical rotation axis, on which at least two rotor blades are arranged,
   wherein the rotor is arranged within a housing,
   wherein a top and a bottom of the housing are arranged essentially vertical to the rotation axis,
   wherein each rotor blade has at least a first height at a first distance parallel to the rotation axis and a second height at a second distance parallel to the rotation axis,
   wherein the first distance and the first height are smaller than the second distance and the second height,
   wherein the rotor is rotatable relative to the housing,
   wherein the housing has at least a first distance between the top and bottom of the housing at a first distance parallel to the rotation axis and a second distance between the top and bottom of the housing at a second distance parallel to the rotation axis,
   wherein the first distance parallel to the rotation axis and the first distance between the top and bottom of the housing are smaller than the second distance parallel to the rotation axis and the second distance between the top and bottom of the housing,
   wherein in that at least one fluid slot is arranged at the top and/or the bottom of the housing, wherein at least one rotor blade comprises a curved first portion, wherein the first portion has a concave side and a convex side, and wherein a curved second portion is arranged on the end of the first portion of the rotor blade facing away from the rotation axis, wherein the second portion has a concave side and a convex side, and
   wherein the two portions are arranged in such a manner that, in the radial direction, the convex side of the first portion is followed by the concave side of the second portion.

2. The fluid turbine according to claim 1, wherein at least two fluid slots are arranged at the top and/or the bottom of the housing.

3. The fluid turbine according to claim 1, wherein at least two fluid slots are arranged at the top and the bottom of the housing.

4. The fluid turbine according to claim 1, wherein a distance between the top of the housing and the rotor blades and between the bottom of the housing and the rotor blades is essentially constant.

5. The fluid turbine according to claim 1, wherein at least one rotor blade comprises at least one opening with an openable closure element.

6. The fluid turbine according to claim 1, wherein an angle formed between the convex side of the first portion and the concave side of the second portion is smaller than 120°.

7. The fluid turbine according to claim 1, wherein at least one wing element is moveably arranged at an upper edge and/or a lower edge of at least one rotor blade.

8. The fluid turbine according to claim 1, wherein at least one vane element is moveably arranged on a side of at least one rotor blade.

9. A fluid turbine, comprising: a rotor, comprising a vertical rotation axis, on which at least two rotor blades are arranged,
   wherein the rotor is arranged within a housing,
   wherein a top and a bottom of the housing are arranged essentially vertical to the rotation axis,
   wherein each rotor blade has at least a first height at a first distance parallel to the rotation axis and a second height at a second distance parallel to the rotation axis, wherein the first distance and the first height are smaller than the second distance and the second height, wherein the rotor is rotatable relative to the housing, wherein the housing has at least a first distance between the top and bottom of the housing at a first distance parallel to the rotation axis and a second distance between the top and bottom of the housing at a second distance parallel to the rotation axis, wherein the first distance parallel to the rotation axis and the first distance between the top and bottom of the housing are smaller than the second distance parallel to the rotation axis and the second distance between the top and bottom of the housing, wherein at least two fluid slots are arranged at the top and the bottom of the housing, wherein a distance between the top of the housing and the rotor blades and between the bottom of the housing and the rotor blades is essentially constant, wherein at least one rotor blade comprises at least one opening with an openable closure element, wherein at least one rotor blade comprises a curved first portion, wherein the first portion has a concave side and a convex side, wherein a curved second portion is arranged on the end of the first portion of the rotor blade facing away from the rotation axis, wherein the second portion has a concave side and a convex side, and wherein the two portions are arranged in such a manner that, in the radial direction, the convex side of the first portion is followed by the concave side of the second portion.

10. The fluid turbine according to claim 9, wherein an angle formed between the convex side of the first portion and the concave side of the second portion is smaller than 120°.

11. The fluid turbine according to claim 10, wherein at least one wing element is moveably arranged at an upper edge and/or a lower edge of at least one rotor blade.

12. The fluid turbine according to claim 11, wherein at least one vane element is moveably arranged on a side of at least one rotor blade.

* * * * *